(12) United States Patent
Huang et al.

(10) Patent No.: US 7,443,550 B2
(45) Date of Patent: Oct. 28, 2008

(54) STRUCTURE OF LIGHT-SOURCE MODULE

(76) Inventors: Yin-Chun Huang, 6F, No. 72-11, Ln. 531, Kuang Fu Rd., Hsinchu (TW); Chih-Wen Huang, 3F, No. 13, Aly. 3, Ln. 33, Kuan Kou St., Hsiang Shan District, Hsinchu (TW)

( * ) Notice: Subject to any disclaimer, the term of this patent is extended or adjusted under 35 U.S.C. 154(b) by 790 days.

(21) Appl. No.: 10/256,962

(22) Filed: Sep. 27, 2002

(65) Prior Publication Data

US 2004/0061910 A1   Apr. 1, 2004

(51) Int. Cl.
 *H04N 1/04* (2006.01)
(52) U.S. Cl. .................. 358/475; 358/474; 358/497
(58) Field of Classification Search .......... 358/475, 358/484, 509, 497, 494, 496, 487, 505, 506, 358/482, 483, 512–514, 482.483; 250/208.1, 250/216, 234–236, 205; 399/221, 220, 211, 399/212; 382/312, 318, 319; 362/551, 560, 362/235, 247, 255, 256, 317, 341, 368, 362
See application file for complete search history.

(56) References Cited

U.S. PATENT DOCUMENTS

| | | | | | |
|---|---|---|---|---|---|
| 3,777,135 A | * | 12/1973 | Rees | ........................... | 362/225 |
| 3,947,115 A | * | 3/1976 | Hamaguchi | .................. | 399/218 |
| 3,977,784 A | * | 8/1976 | Hara | ............................. | 355/67 |
| 4,483,609 A | * | 11/1984 | Harada | ........................ | 399/221 |
| 4,769,718 A | * | 9/1988 | Imamura | ..................... | 358/482 |
| 4,779,121 A | * | 10/1988 | Okumura | ..................... | 355/68 |
| 4,891,739 A | * | 1/1990 | Yasuda | ........................ | 362/296 |
| 5,075,720 A | * | 12/1991 | Takeda et al. | .................. | 355/67 |
| 6,236,470 B1 | * | 5/2001 | Seachman | .................... | 358/471 |
| 6,266,163 B1 | * | 7/2001 | Hirakawa | ................... | 358/475 |

* cited by examiner

*Primary Examiner*—Cheukfan Lee
(74) *Attorney, Agent, or Firm*—Stolowitz Ford Cowger LLP

(57) ABSTRACT

The invention discloses an improved structure of light-source module, which arranges a reflection piece of light-source module in an image picking-up device of optical scanner. The invention applies the design of improved reflection piece to generate a compensatory function to the light source to reduce the waste formed by the light dissipation, which will be gathered by the reflection piece and be reflected to the document to be scanned. With the design of appropriate angle and position, the reflection piece may completely reflect the light onto the document to be scanned for obtaining a preferable quality of scanned image. Wherein, the reflection piece may be designed as two pieces, one of which may reach the function of light compensation, or one reflection piece may be designed as two reflection parts, one of which may reach the function of light compensation.

71 Claims, 8 Drawing Sheets

STRUCTURE OF LIGHT-SOURCE MODULE

FIELD OF THE INVENTION

The invention relates to an improved structure of a light-source module, particularly to an improved design of the reflection piece of a light-source module in an image picking-up device.

BACKGROUND OF THE INVENTION

Accordingly, the computer has already penetrated into each family and enterprise to become an indispensable electronic product in our modem daily lives. Following the prevalence of computer multimedia, more accessory products are needed for input and output, wherein the scanner is one important item of them for processing image or inputting character data, so the usage range of the scanner is very extensive.

Currently, the optical scanner that is applied for ordinary document uses a light source arranged on the lamp seat to irradiate light onto the document and picture, from which the reflected light is again reflected through several reflection mirrors and finally enters into the photoelectric coupling element to be converted into electronic signals that are processed by the circuit to display as a scanned image. Therefore, the stability, the uniformity and the intensity of the light generated from the light source will influence the quality of the scanned image, because the reflected light of the poor or insufficient light source will make the image generated from the photoelectric coupling element be unrealistic or generate unnecessary noise to influence the normal scanning quality of the scanner.

Please refer to FIG. 1, which is a 3-D structure for illustrating a flatbed-type optical scanner typically seen in the current market. Mainly, a manuscript supporting glass 12 is arranged at the top surface of the outer shell 11 of an optical scanner 1 for supporting a reflective manuscript 15. Through being driven along by a driving device 13, an image picking-up device 2 makes a linear motion along a guiding rod 14 in the hollow outer shell 11, such that an image scanning job is executed on the reflective document 15 supported upon the manuscript supporting glass 12.

Please refer to FIG. 2, which illustrates a light-source module in the image picking-up device according to the prior art. As shown in FIG. 2, a light-source module 20 is designed in an image picking-up device 2 of FIG. 1. A rectangular lampholder 201 in the light-source module 20 provides a (mechanical) support to light source (e.g., lamp tube 200). A reflection piece 202 is arranged at the inside surface of the lampholder 201 for focusing and compensating the light emitted from the lamp tube 200 and then reflecting it onto the manuscript 15. However, since the brightness of the light source is restricted by the fluorescent tube itself, so the uneven brightness will influence the quality of the scanned image.

When an optical scanner executes a scanning job upon an object to be scanned, for example, the light-source module 20 irradiating light onto the manuscript 15 as shown in FIG. 2, the light will pass through an opening 210 and be projected toward the manuscript 15 and, except the light irradiated from the lamp tube 200 and directly projected toward the manuscript 15, there is also another light coming from the light source but reflected from the reflection piece 202 in the lampholder 201 to be projected upon the manuscript 15, so all the reflected light and the irradiated light will be projected upon the scanning range 150 of the manuscript 15. However, the shortcoming of this arrangement is that the light 22 reflected from the reflection piece 202 will be incident upon the second scanning ranges 151, 152 of the manuscript 15 because of the reflection angle, and the light 22 incident upon the second scanning range 151 is wasted and insufficiently used. Because only one unit scanning line is scanned in every unit time during the scanning process of a scanner, for example, the first scanning range 150, the light 22 incident outside the first scanning range 150 (for example, the second scanning ranges 151, 152) is not utilized completely, and this is very inefficient. If the light 22 incident upon the second scanning ranges 151, 152 may be changed to be incident upon the first scanning range 150, then it means that the light source may be utilized in a more efficient way, because the manuscript 15 will be projected with more intensive light and a superior quality of scanned image may thereby be obtained.

SUMMARY OF THE INVENTION

In order to improve shortcomings according to the prior art, the main objective of the invention is to make an improving design on the reflection piece of the light-source module in the image picking-up device, wherein a compensatory function to the light source is designed mainly by improving the structure of the reflection piece to reduce the wasted light because of dissipation, such that part of the light dissipated from the reflection piece (e.g., the light 22 in FIG. 2) will be gathered again and reflected toward the scanned document and, meanwhile, a structural design of appropriate angle and position will be applied to facilitate the reflection piece in reflecting the light completely upon the scanned document to obtain a preferable quality of scanned image.

In the first preferable embodiment of the invention, the invention includes a lamp tube, lampholder, first reflection piece, and second reflection piece, etc. The first reflection piece is responsible for the function of reflecting the light originally emitted from the lamp tube, while the second reflection piece is responsible for the functions of gathering the dissipated light and reflecting it onto the scanned manuscript. The first reflection piece is abutted against the inside surface of the lampholder, while the second reflection piece is fixed at the upper portion of the lamp tube by a fixation device.

In the second preferable embodiment of the invention, the invention includes a lamp tube, lampholder, and a reflection piece, etc. The reflection piece may be divided into a first reflection part, and a second reflection part, wherein the first reflection part may exhibit the same function as the second reflection piece of the first preferable embodiment, and the second reflection part may exhibit the same function as the first reflection piece of the first preferable embodiment. The second reflection part is abutted against the inside surface of the lampholder.

In the third preferable embodiment of the invention, the invention includes a lamp tube, lampholder, and a reflection piece, etc. The reflection piece includes a first reflection part and a second reflection part, wherein the first reflection part may exhibit the same function as the second reflection piece of the first preferable embodiment, and the second reflection part may exhibit the same function as the first reflection piece of the first preferable embodiment. The second reflection part is located between the inside surface of the lampholder and the lamp tube, while the second reflection part is not arranged the same as that in the second preferable embodiment-abutted against the inside surface of the lampholder, but is kept with an appropriate distance. The reflection piece is fixed at the two sides of the lamp tube by the fixation part.

In order to further describe the invention in more depth, a detailed description together with corresponding drawings are presented as the following in hoping that those will benefit your esteemed committee member in reviewing the present patent application.

DETAILED DESCRIPTION OF THE INVENTION

The invention is an improved structure of a light-source module, which is mainly arranged in an image picking-up device of optical scanner. When scanning an image, the image picking-up device moves back and forth respecting to the document to be scanned in the hollow shell body and, at this time, the light-source module provides a light source needed by the optical scanner for scanning the document to be scanned during the scanning process. By designing an improved reflection piece to make a compensatory function to the light source, part of the dissipated light will be gathered again and be reflected onto the document to be scanned, and a structure designed with an appropriate angle and position may completely reflect the light onto the document to be scanned, such that the shortcomings of the prior arts may be improved and, not only may the brilliance of the light source distributed uniformly, but also may the total efficiency of the light emitted from the light source be developed, so the intensity of the light irradiated upon the document may be further enhanced and, therefore, a preferable quality of scanned image is obtained.

For your esteemed member of reviewing committee to further understand the invention, a detailed structure together with its connection relationship and corresponding drawings are presented as the following.

Figure 3A:
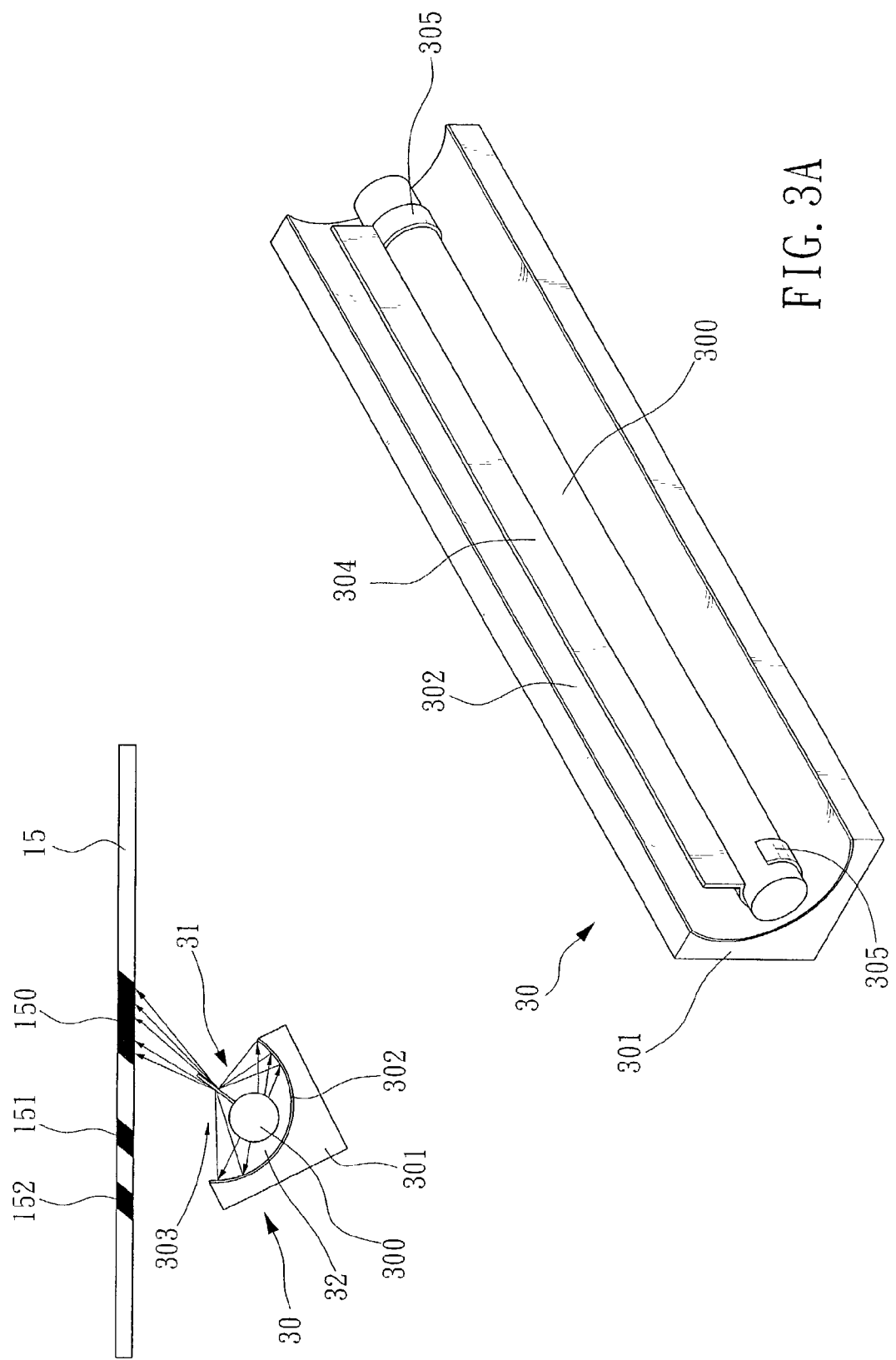
FIG. 3A illustrates the light reflection of the first preferable embodiment of the invention.

Please refer to FIG. 3A, which illustrates the light reflection of the first preferable embodiment of the invention. As shown in FIG. 3A, the present embodiment is an improved structure that is applied in the light source (e.g., lamp tube 300) in the light-source module. The structure includes a lamp tube 300, a lampholder 301, a first reflection piece 302, and a second reflection piece 303, etc. The lamp tube 300 provides a light source needed by the optical scanner in the scanning process. The lampholder 301 is designed in the rear portion of the lamp tube 300 to partially cover it to provide a (mechanical) support to the lamp tube 300. The interior of the lampholder 301 is formed as an arc hollow structure 32 that may accommodate the lamp tube 300. A smooth reflection piece (e.g., the first reflection piece 302) is arranged at the inside surface of the arc hollow structure 32. The first reflection piece 302 is applied to reflect the light emitted from the lamp tube 300 onto the first scanning range 150 of the manuscript 15. The light of the lamp tube 300 and the reflected light of the first reflection piece 32 may be projected onto the scanned manuscript 15 through the opening 31.

Furthermore, the characteristics of the first preferable embodiment further include a second reflection piece 303, which is arranged at the upper portion of the lamp tube 300, and by which part of the light reflected from the first reflection piece 302 is blocked from being projected toward the second scanning range 151 of the scanned manuscript 15 and is reflected onto the first scanning range 150. In such a way, the useless light (e.g., the light 22 in FIG. 2) that originally will be projected toward the second scanning ranges 151 or 152 during the scanning process is guided to the zone 150 needed to be scanned. Since the light projected onto the second scanning ranges 151 or 152 does not help the quality of the scanned image, the invention guides this useless light to be projected toward the first scanning range 150 to become an effective light. Therefore, the invention indeed provides an enhancement of new function, such that the design manner of less efficient light source according to the prior art may be improved.

Through the design of the second reflection piece 303, it can be avoided the useless light to be dissipated to other places and, under the cooperation of the first reflection piece 302, most of the light emitted from the lamp tube 300 is gathered and reflected onto the manuscript 15 to be scanned; that is, the originally dissipated light may be gathered and reflected onto the effective zone to be scanned at the meantime of scanning process.

Figure 3B:
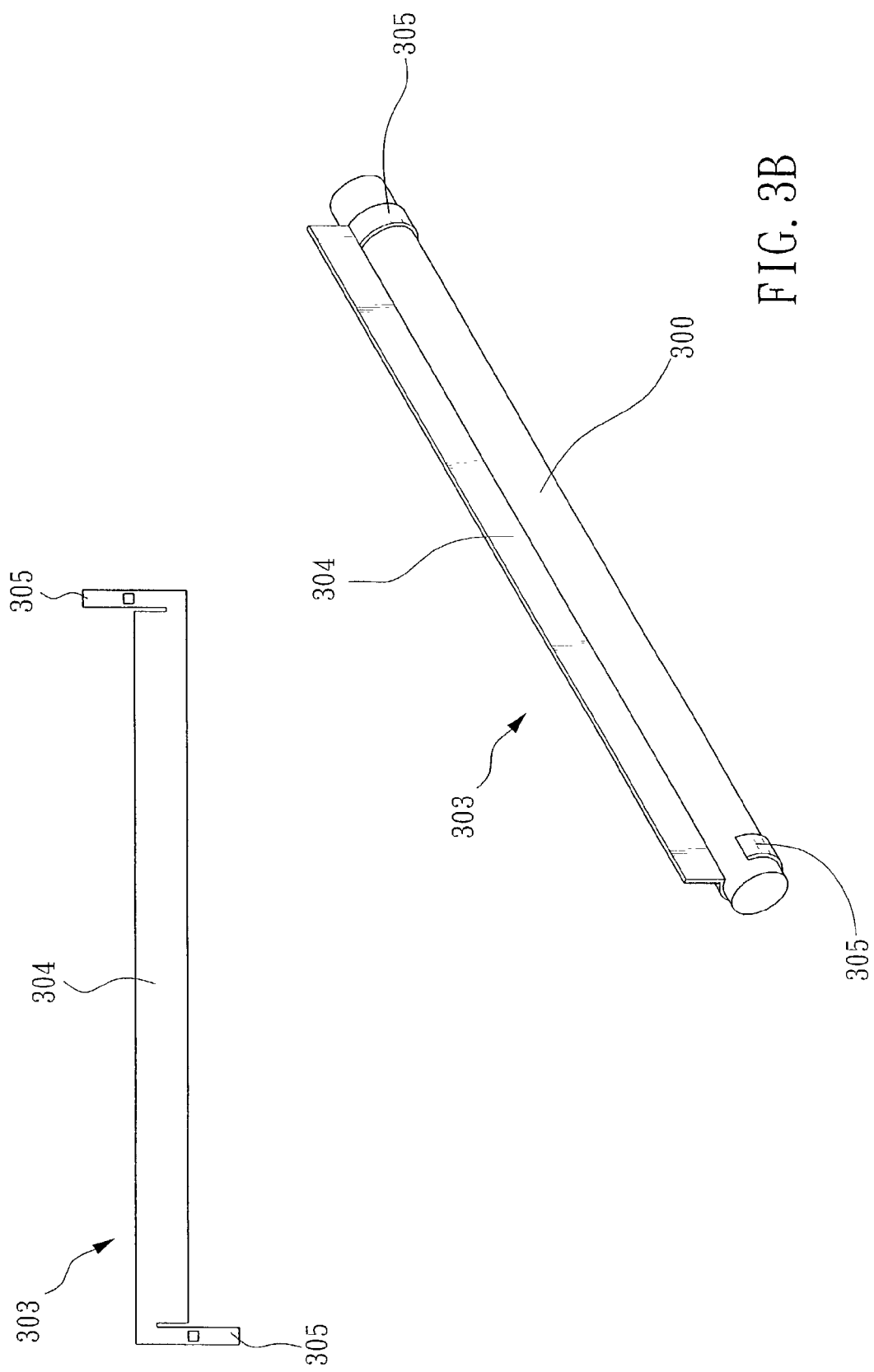
FIG. 3B is a structural illustration for the first preferable embodiment of the invention.

Please refer to FIG. 3B, which is a structural illustration for the first preferable embodiment of the invention. As shown in FIG. 3B, the second reflection piece 303 includes reflection part 304 and fixation part 305, wherein the reflection part 304 is a stripe-typed structure, of which the length is about the same as that of the lamp tube 300. The fixation part 305 is located at the two sides of the reflection part 304. The second reflection piece 303 may be fixed at the two sides of the lamp tube 300 through the fixation part 305, such that the second reflection piece 303 is fixed at the upper portion of the lamp tube 300. For example, the fixation part 305 may be fixed at the two sides of the lamp tube through a winding around manner. Of course, other fixation manners may also be available. Wherein, a tangent of appropriate angle is formed between the second reflection piece 303 and the surface of the lamp tube 300. This tangent angle is relative to the reflection angle of the light 22 said in FIG. 3A and is adjustable according to the needed situation in practical application.

Figure 4A:
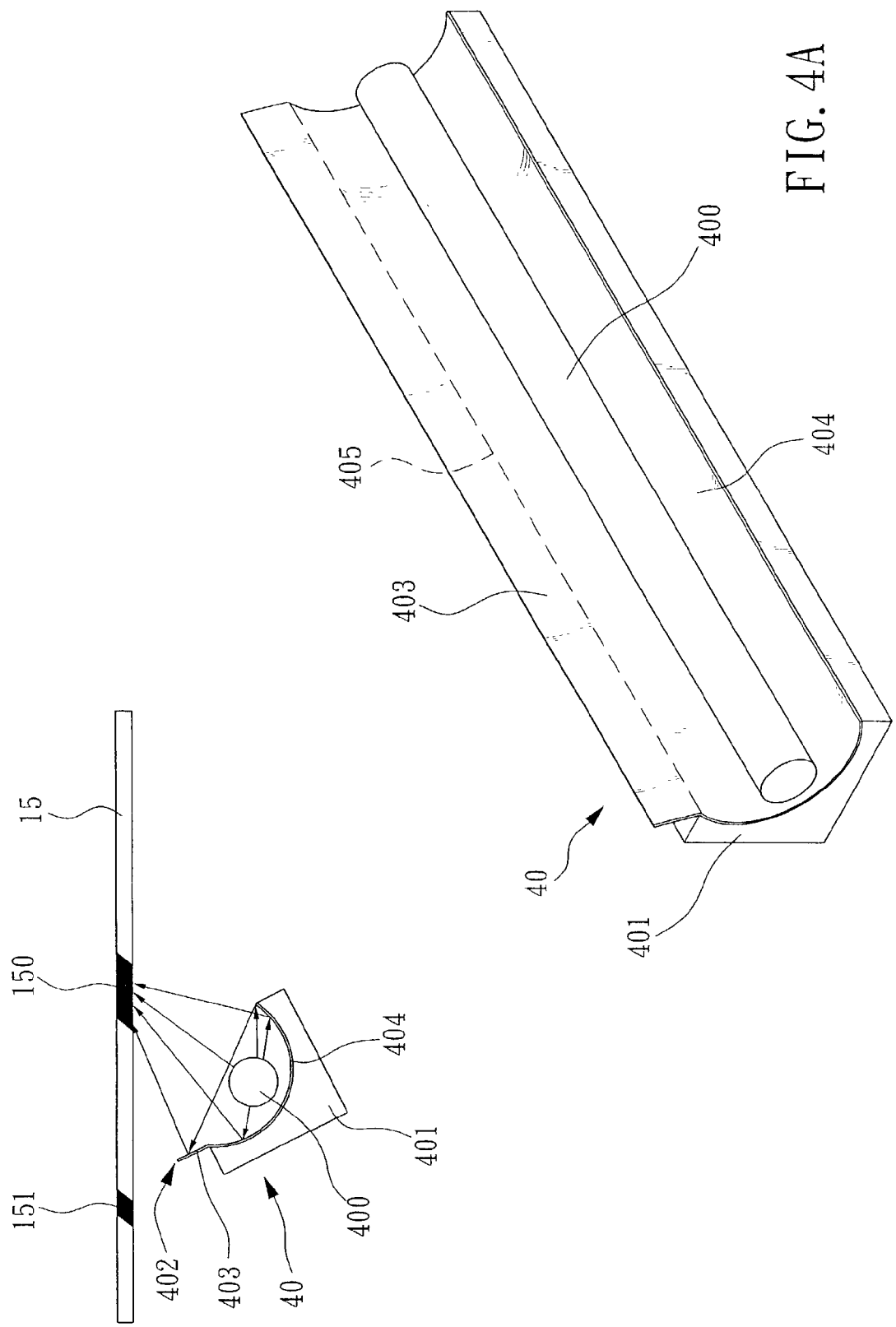
FIG. 4A illustrates the light reflection of the second preferable embodiment of the invention.

Please refer to FIG. 4A, which illustrates the light reflection of the second preferable embodiment of the invention. As shown in FIG. 4A, this preferable embodiment also makes a same improved design to the reflection piece. The light-source module 40 includes a lamp tube 400, a lampholder 401, and a reflection piece 402, etc. Wherein, the relative structures, functions, and situations of light reflection of the lamp tube 400, the lampholder 401, the manuscript 15, the first scanning range 150. and the second scanning range 151 are roughly the same as those in FIG. 3A. The characteristic of this second preferable embodiment is that the needed number of the reflection piece 402 is only one piece, but it may be designed into two reflection parts: the first reflection part 403 and the second reflection part 404, both which may be made through bending the bending line 405, wherein the second reflection part 404 of the reflection piece 402 is designed to be abutted against the inside surface of the lampholder 401 to make a light reflection to the light emitted from the lamp tube 400, so an appropriate distance is kept between the first reflection part 403 and the lamp tube 400 to make the light process reflection.

Figure 4B:
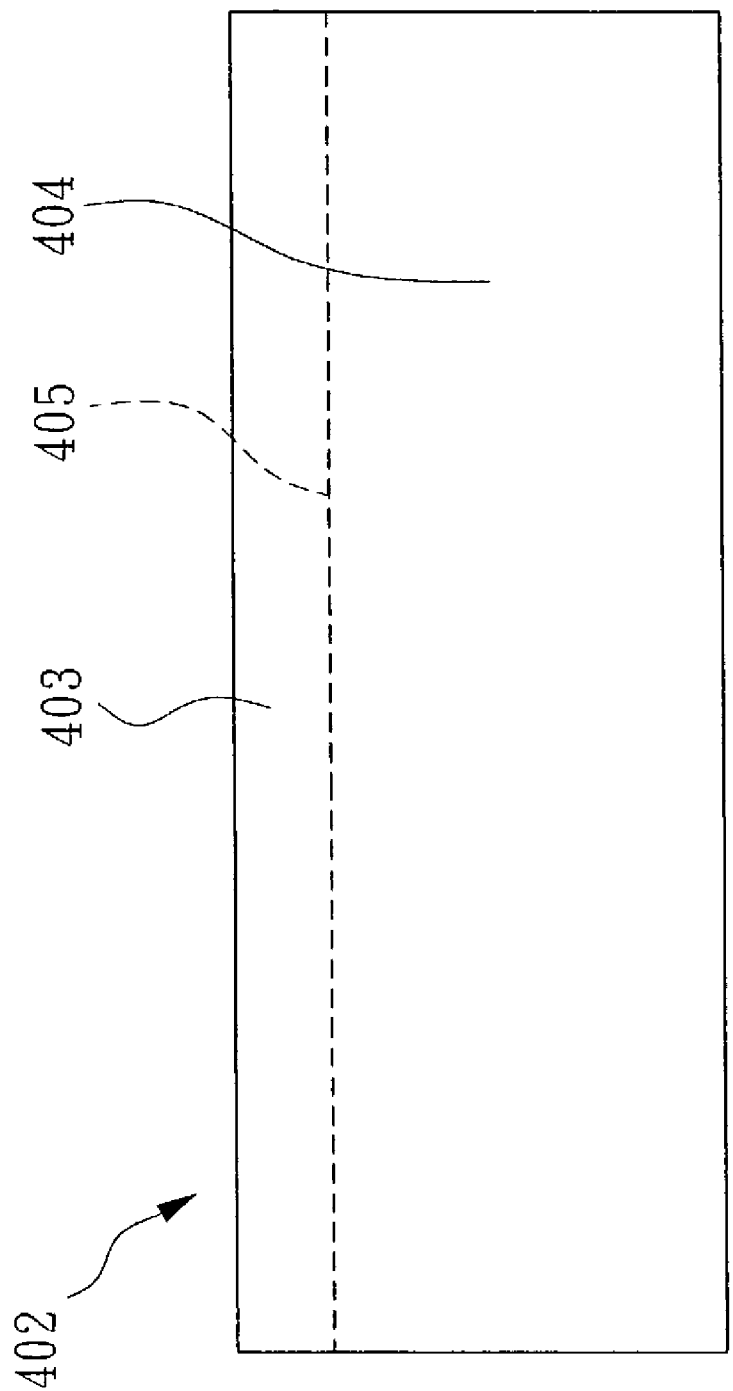
FIG. 4B is a structural illustration for the second preferable embodiment of the invention.

Please refer to FIG. 4B, which is a structural illustration for the second preferable embodiment of the invention. As shown in FIG. 4B, it is bendable between both the first reflection part 403 and the second reflection part 404 of the reflection piece 402. There is one bending line 405 between the first reflection part 403 and the second reflection part 404. The reflection piece 402 may be bent into an appropriate angle, which is adjustable depending upon the real need of the practical design. Its purpose is still to block partial light (e.g., the light 22 In FIG. 2) from being projected onto the second scanning range 151 of the manuscript 15. Through the design of this second preferable embodiment, there won't be any situation like the light 22 in FIG. 2 to be generated. The function of the first reflection part 403 is same as that of the second reflection piece 303 in FIG. 3A and FIG. 3B, while the function of the second reflection part 404 is same as that of the first reflection piece 302 in FIG. 3A and FIG. 3B, and the only different point is that the first reflection part 403 and the second reflection part 404 may be made integrally as one body to become one reflection piece 402.

Figure 5A:
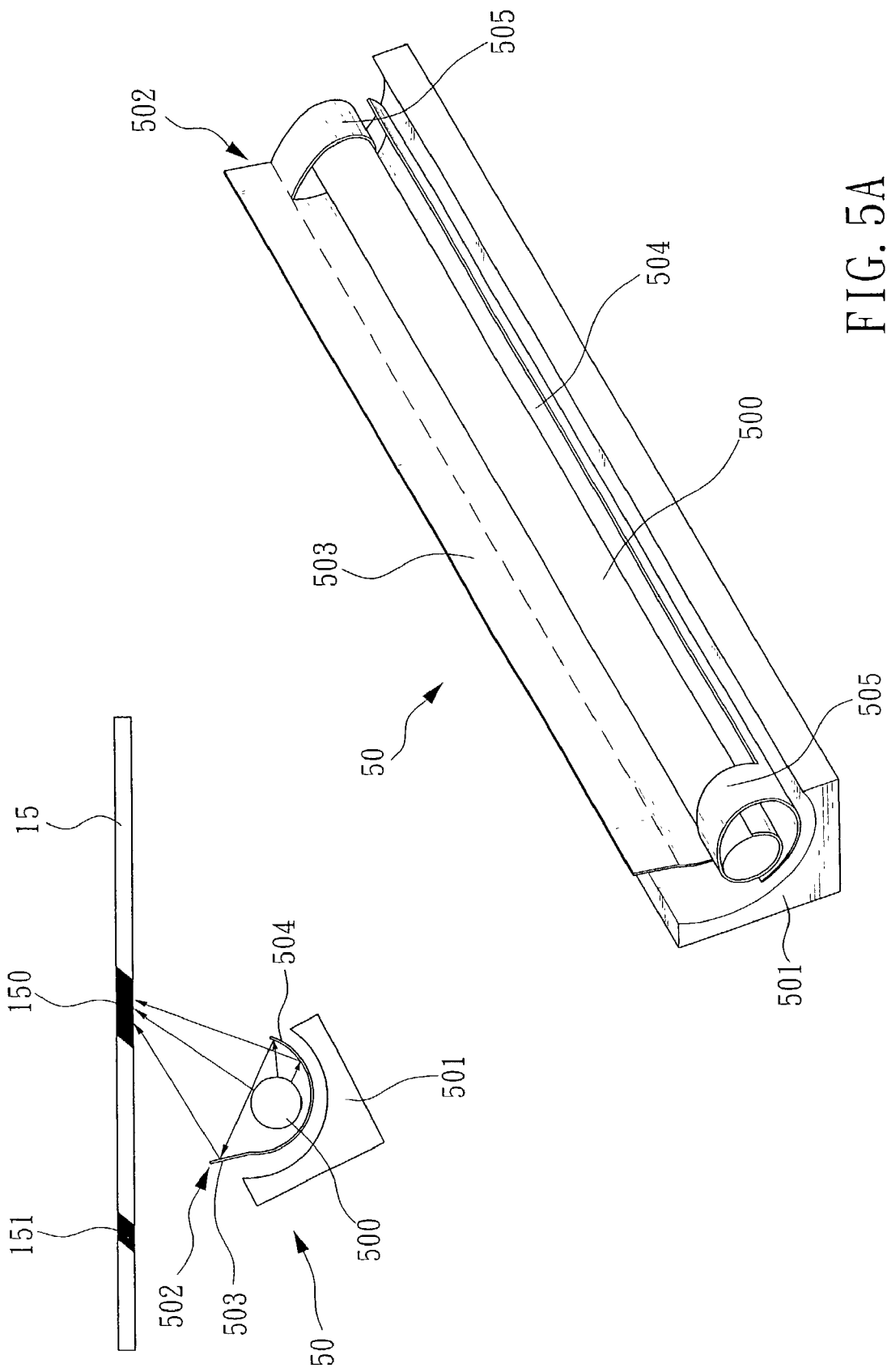
FIG. 5A illustrates the light reflection of the third preferable embodiment of the invention.

Please refer to FIG. 5A, which illustrates the light reflection of the third preferable embodiment of the invention. As shown in FIG. 5A, this preferable embodiment also makes a same improved design to the reflection piece. The light-source module 50 includes a lamp tube 500, a lampholder 501, and a reflection piece 502, etc. Wherein, the relative structures, functions, and situations of the light reflection of the lamp tube 500, the lampholder 501, the manuscript 15, the first scanning range 150, and the second scanning range 151 are roughly same as those in FIG. 3A. The number of the reflection piece 502 in this third preferable embodiment is still only one. The reflection piece 502 is also divided into two reflection parts: a first reflection part 503 and a second reflection part 504, wherein the reflection piece 502 is designed between the inside surface of the lampholder 501 and the lamp tube 500. Unlike the design in FIG. 4—the second reflection piece 404 is abutted against the inside surface of the lampholder 401, the second reflection part 504 is kept an appropriate distance from the inside surface of the lamp 500 to let the light reflected. The lampholder 501 may still provide a mechanical support to the lamp tube 500, while the reflection piece 502 may be fixed at the two sides of the lamp tube 500 through the fixation part 505.

Figure 1:
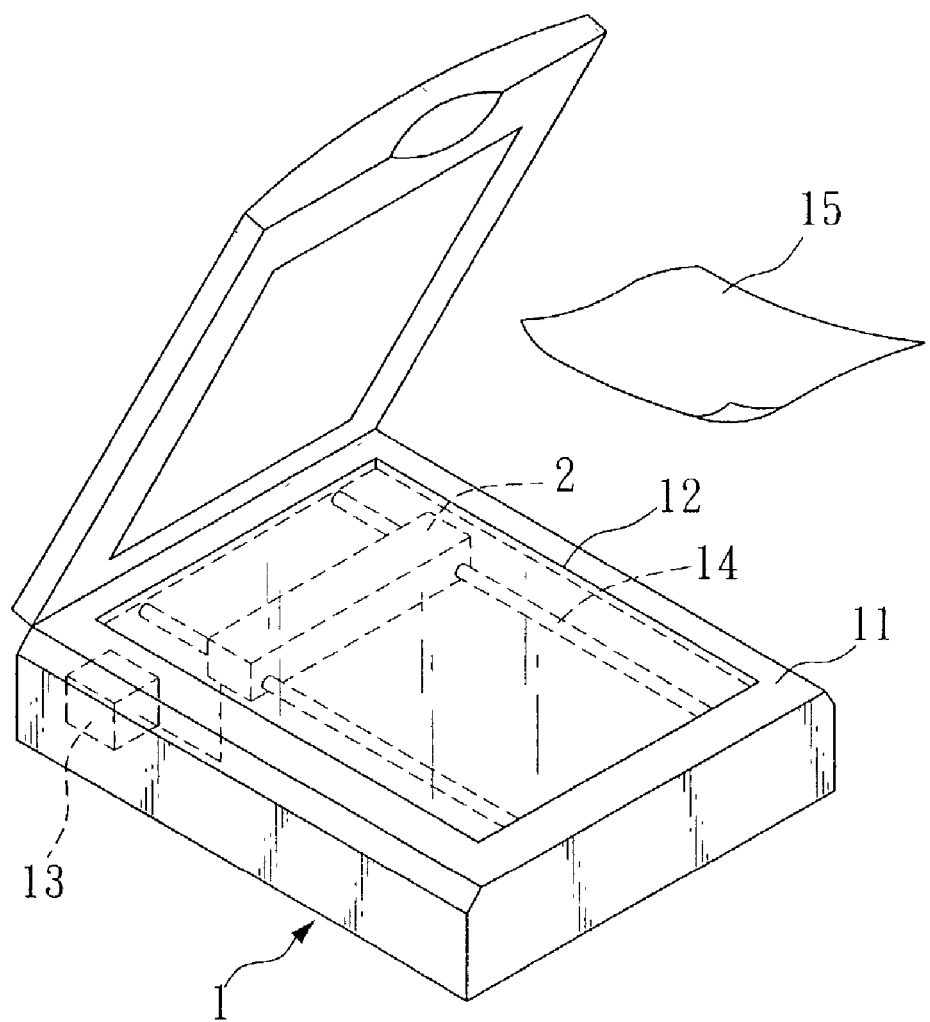
FIG. 1 is a 3-D structure for illustrating a flatbed-type optical scanner according to the prior art.
Figure 2:
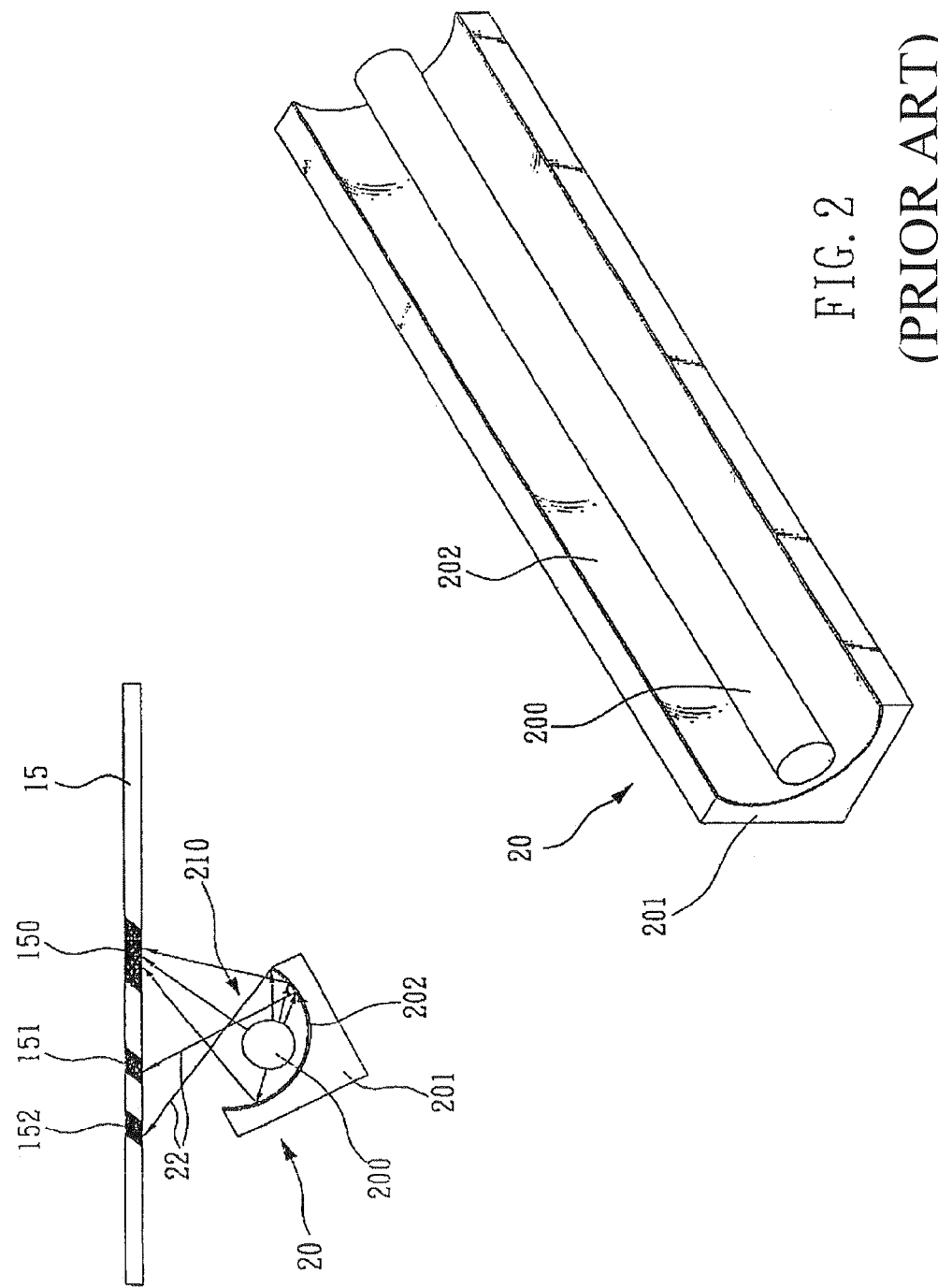
FIG. 2 is an illustration for the lamp seat of the light source in the image picking-up device according to the prior art.

It is still bendable between the first reflection part 503 and the second reflection part 504. An appropriate angle may also be made and be adjustable according to the need of actual design. Through the design of this third preferable embodiment, the light 22 in FIG. 2 is generated similarly. The function of the first reflection part 503 is the same as that of the second reflection piece 503 in FIG. 3A and FIG. 3B—it prevents the light from dissipation and reflects the light onto the manuscript 15, while the function of the second reflection part 504 is same as that of the first reflection piece 302 in FIG. 3A and FIG. 3B. The first reflection part 503 and the second reflection part 504 may be made integrally into one body to become one reflection piece 502.

Figure 5B:
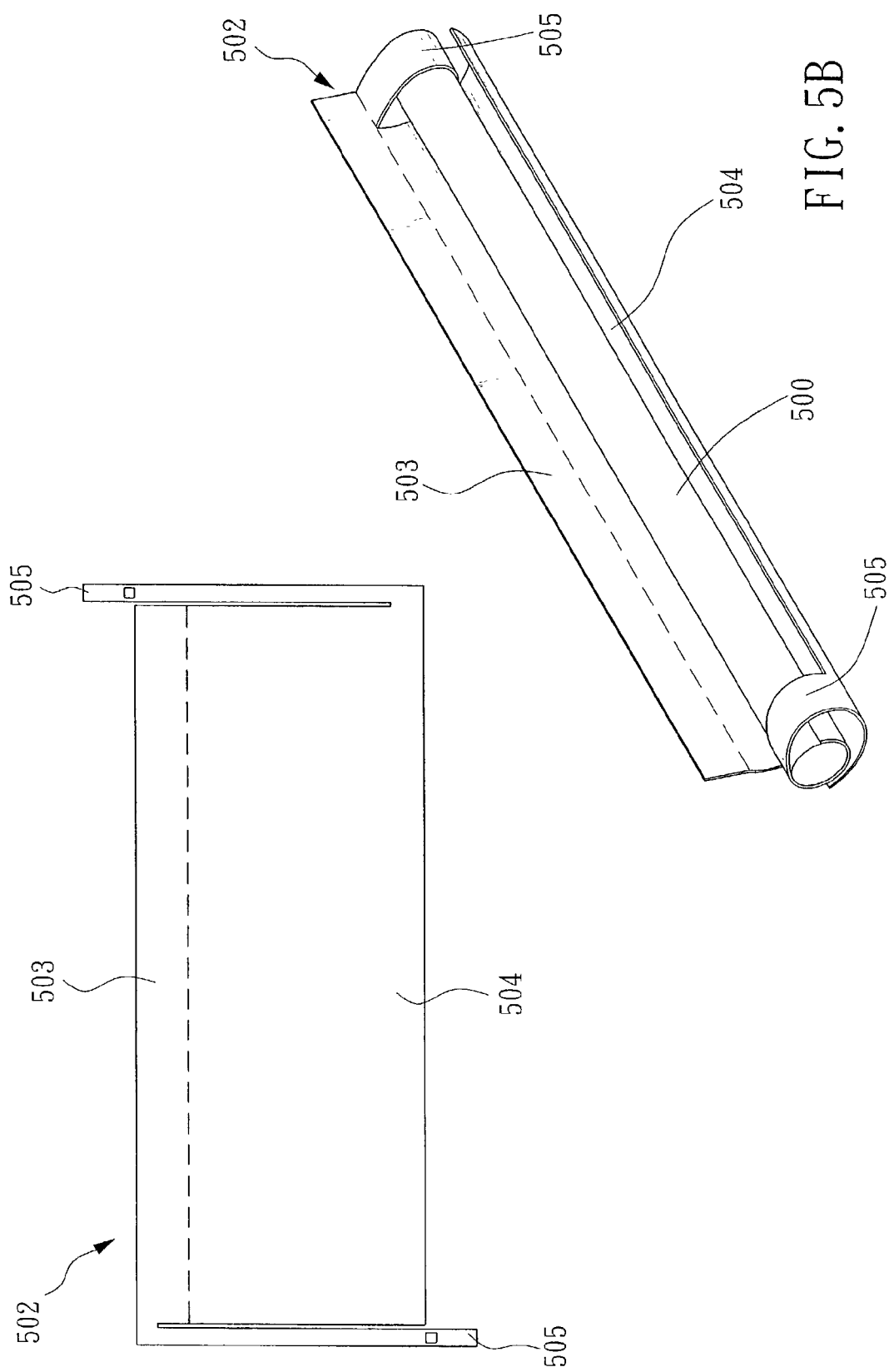
FIG. 5B is a structural illustration for the third preferable embodiment of the invention.

Please refer to FIG. 5B, which is a structural illustration for the third preferable embodiment of the invention. As shown In FIG. 5B, the reflection piece 502 includes a first reflection part 503, a second reflection part 504, and a fixation part 505. The fixation part 505 is located at the two sides of the reflection piece 502 and is fixed corresponding to two sides of the lamp tube 500 to further fix the second reflection piece 502 at the upper portion of the lamp tube 500. For example, the fixation part 505 may be fixed at the two sides of the lamp tube 500 by a winding around manner. Of course, other fixing manner may also be applied. Similarly, an appropriate angle may be bent between the first reflection part 503 and the second reflection part 504.

Through the description of each preferable embodiment said thereinbefore, the invention may improve the design of the reflection piece of the light-source module into two reflection pieces, or a reflection piece that has two reflection parts. Each embodiment has its own characteristic and may exhibit similar function; namely, the light emitted from the light source is appropriately gathered and is uniformly distributed onto the manuscript to be scanned, such that the unnecessary waste of light may be prevented from being dissipated and the loss of light may be compensated, so an intensive irradiation of light may be projected onto the manuscript. The invention may provide the light of the light source with an effective reflection function and an enhancement of new effectiveness to improve the quality of the scanned image.

What is claimed is:

1. A light-source module to provide light to an object to be scanned, the light-source module comprising:
   a lamp to provide light; and
   a lampholder having an interior comprising a hollow structure with a concave groove for accommodating the lamp, wherein the concave groove has a shape corresponding to the lamp, wherein a first reflection piece is arranged at a surface of the hollow structure to reflect the light emitted from the lamp, wherein the lampholder further includes an opening positioned such that both the light of the lamp and the reflected light from the first reflection piece pass tbrough the opening and are projected onto a scanning range, and wherein a second reflection piece is arranged at a portion of the lamp to reflect partially dissipated light into the scanning range.

2. A light-source module according to claim 1, wherein said second reflection piece includes a reflection part, which is formed as a stripe-shaped structure, said second reflection piece having a length approximately equal to a length of the lamp.

3. A light-source module according to claim 1, wherein said second reflection piece further includes a fixation part located at two sides of the reflection part, and wherein the second reflection piece may be fixed at an upper portion of the lamp by fixing the fixation part at two sides of the lamp.

4. A light-source module according to claim 1, wherein a tangent angle is fainted between the second reflection piece and the surface of the lamp.

5. The light-source module according to claim 1 wherein said first reflection piece and said second reflection piece are different portions of one reflection member.

6. The light-source module according to claim 1 wherein said first reflection piece and said second reflection piece comprise separate reflection members.

7. A light-source module for an optical scanner, the light-source module comprising:
   a lampholder comprising a hollow structure with a concave groove for accommodating a lamp to provide light, wherein the concave groove has a shape corresponding to the lamp, wherein a reflection assembly is arranged to reflect the light emitted from the lamp, wherein the lampholder further includes an opening positioned such that both the light of the lamp and the reflected light from the reflection assembly pass through the opening and are projected onto a scanning range, and wherein the reflection assembly has a first reflection part and a second reflection part, the first reflection part positioned at least partially above an upper portion of the lamp to reflect the partially dissipated light into the scanning range, the second reflection part located between the surface of the hollow structure and the lamp to reflect light emitted from the lamp through the opening and onto the scanning range, the second reflection part at least partially wound around the lamp in an arc structure.

8. A light-source module according to claim 7, wherein said second reflection part is abutted against the inside surface of the lampholder and is maintained at an appropriate distance from the lamp.

9. A light-source module according to claim 7, wherein said first reflection part is located between the inside surface of the lampholder and the lamp and is maintained at an appropriate distance.

10. A light-source module according to claim 7, wherein said first reflection part is formed as a stripe-shaped structure having a length approximately equal to that of the lamp.

11. A light-source module according to claim 7, wherein said second reflection part is foliated as a stripe-shaped structure having a length approximately equal to that of the lamp.

12. A light-source module according to claim 7, wherein the reflection assembly further includes a fixation part, which is located at the two sides of the reflection assembly fixable at the two sides of the lamp by fixing the fixation part.

13. A light-source module according to claim 7, wherein a tangent angle is formed between said first reflection part and the surface of the lamp.

14. An optical scanning apparatus comprising:
a light holder having a curved surface capable of accommodating a light, an opening, a first reflection portion capable of reflecting light emitted from the light onto a first scanning range of a document, and a second reflection portion arranged in a light path of the light that is capable of reflecting dissipated light into the first scanning range and blocking the dissipated light from reaching a different, second scanning range of the document, wherein the second reflection portion is directly connected to the light.

15. The apparatus of claim 14 wherein the first reflection portion is located on the interior surface of the light holder.

16. The apparatus of claim 14 wherein the interior surface of the light holder is comprised of a reflective material that comprises the first reflection portion.

17. The apparatus of claim 14 wherein the first reflection portion is located at a distance from the interior surface of the light holder.

18. The apparatus of claim 14 wherein the second reflection portion is arranged at a distance from the light.

19. The apparatus of claim 14 wherein an angle is formed between the second reflection portion and the light to facilitate reflection into the first scanning range.

20. The apparatus of claim 19 wherein the angle is adjustable.

21. The apparatus of claim 14 wherein a tangent angle is formed between the second reflection portion and the light.

22. The apparatus of claim 21 wherein the tangent angle is relative to a reflection angle for reflecting light into the first scanning range.

23. The apparatus of claim 14 wherein the second reflection portion is capable of blocking dissipated light from reaching one or more incident scanning ranges.

24. The apparatus of claim 14 wherein the second reflection portion is capable of reflecting light dissipated from the first reflection portion into the first scanning range.

25. The apparatus of claim 14 wherein the second reflection portion is capable of gathering and reflecting light dissipated from the first reflection portion into the first scanning range.

26. The apparatus of claim 14 wherein the first reflection portion has a length approximately equal to a length of the light.

27. The apparatus of claim 14 wherein the first reflection portion is stripe-shaped.

28. The apparatus of claim 14 further comprising a fixation part that is capable of connecting the second reflection portion to the light.

29. The apparatus of claim 14 wherein the light holder is capable of providing mechanical support for the light.

30. The optical scanning apparatus of claim 14 wherein the first reflection portion has a bent portion arranged in a light path of the light that is capable of reflecting dissipated light into the first scanning range.

31. A method of reflecting dissipated light in an optical scanning apparatus comprising:
reflecting light emitted from a light into a first scanning range of a document with a first reflection portion arranged in a light holder capable of accommodating the light;
preventing dissipated light that is reflected from the first reflection portion from striking a second scanning range of the document with a second reflection portion that is arranged in a light path of the dissipated light and is directly connected to the light; and
reflecting the dissipated light into the first scanning range with the second reflection portion.

32. The method of claim 31 wherein the first reflection portion is located on the interior surface of the light holder.

33. The method of claim 32 wherein the first reflection portion comprises a flexible reflective material that is affixed on an interior surface of the light holder.

34. The method of claim 31 wherein the first reflection portion is positioned at a distance from an interior surface of the light holder.

35. The method of claim 31 wherein the second reflection portion is positioned at a distance from the light.

36. The method of claim 31 wherein the second reflection portion and the light form an angle to facilitate reflection into the first scanning range.

37. The method of claim 31 wherein the angle is adjustable.

38. The method of claim 31 wherein the second reflection portion and the light form a tangent angle.

39. The method of claim 38 wherein the tangent angle is relative to a reflection angle for reflecting light into the first scanning range.

40. The method of claim 31 further comprising gathering and reflecting light dissipated from the first reflection portion into the first scanning range with the second reflection portion.

41. The method of claim 31 wherein the first reflection portion has a length that is approximately equal to a length of the light.

42. The method of claim 31 wherein the first reflection portion is stripe-shaped.

43. The method of claim 31 wherein the second reflection portion is connected to the light with a fixation part.

44. The method of claim 31 further comprising providing mechanical support for the light with the light holder.

45. The method of claim 31 wherein the light is a light source.

46. The method of claim 31 further comprising reflecting dissipated light with a bent portion on said reflection portion that is arranged in the light path of the light.

47. An optical scanning apparatus comprising:
means for reflecting light emitted from a lamp into a first scanning range of a document with a first reflection portion;
means for reflecting dissipated light that is reflected from the first reflected portion into the first scanning range, wherein the means for reflecting dissipated light is configured to prevent dissipated light from striking a second scanning range of the document with a second reflection portion that is arranged in a light path of the dissipated light, and wherein the means for reflecting dissipated light is located in a light path of the lamp and is directly connected to the lamp.

48. The apparatus of claim 47 further comprising means for accommodating the lamp.

49. The apparatus of claim 48 wherein the means for accommodating the lamp has an interior surface, and wherein the means for reflecting light emitted comprises a flexible reflective material affixed to the interior surface of the means for accommodating.

50. The apparatus of claim 48 wherein the means for reflecting light emitted is located at a distance from the means for accommodating.

51. The apparatus of claim 48 wherein the means for reflecting dissipated light is abutted against the interior surface of the means for accommodating.

52. The apparatus of claim 47 wherein the means for reflecting light emitted is located on an interior surface of a lamp holder.

53. The apparatus of claim 52 further comprising means for connecting the means for reflecting dissipated light to the lamp holder.

54. The apparatus of claim 52 further comprising means for connecting the means for reflecting light emitted to the lamp holder.

55. The apparatus of claim 47 wherein the means for reflecting dissipated light is arranged at a distance from the lamp.

56. The apparatus of claim 47 wherein an angle is formed between the means for reflecting dissipated light and the lamp to facilitate reflection into the first scanning range.

57. The apparatus of claim 56 wherein the angle is adjustable.

58. The apparatus of claim 47 wherein a tangent angle is formed between the means for reflecting dissipated light and the lamp.

59. The apparatus of claim 58 wherein the tangent angle is relative to the reflection angle for reflecting light into the first scanning range.

60. The apparatus of claim 47 wherein the means for reflecting dissipated light further comprises means for blocking dissipated light from reaching another scanning range.

61. The apparatus of claim 47 wherein the means for reflecting dissipated light further comprises means for reflecting light dissipated from the means for reflecting light emitted into the first scanning range.

62. The apparatus of claim 47 wherein the means for reflecting dissipated light further comprises means for gathering and reflecting light dissipated from the means for reflecting light emitted into the first scanning range.

63. The apparatus of claim 47 wherein the means for reflecting light emitted has a length that is approximately equal to a length of the lamp.

64. The apparatus of claim 47 wherein the means for reflecting light emitted is stripe-shaped.

65. The apparatus of claim 47 further comprising means for connecting the means for reflecting dissipated light to the lamp.

66. The apparatus of claim 47 further comprising means for connecting the means for reflecting light emitted to the lamp.

67. The apparatus of claim 47 further comprising means for providing mechanical support for the lamp.

68. The apparatus of claim 47 wherein the means for reflecting light emitted is bent around the lamp.

69. A light-source module for optical scanning comprising:
a lampholder for accommodating a lamp, wherein a first reflection piece is arranged at an inside surface of the lampholder to reflect light emitted from the lamp, wherein the lampholder further includes an opening positioned such that both the light of the lamp and the reflected light from the first reflection piece pass through the opening and are projected onto a scanning range, and wherein a second reflection piece is arranged at a portion of is directly coupled to the lamp to reflect partially dissipated light into the scanning range.

70. A light-source module for optical scanning comprising:
a lampholder for accommodating a lamp, wherein the lampholder has a shape corresponding to the lamp, wherein a reflection piece is arranged at an inside surface of the lampholder to reflect light emitted from the lamp, wherein the lampholder further includes an opening positioned such that both the light of the lamp and the reflected light from the reflection piece pass through the opening and are projected onto a scanning range, and wherein the lampholder further includes another reflection piece directly coupled to the lamp to prevent the reflected light from striking another scanning range.

71. An optical scanning apparatus comprising:
a light holder having a curved surface capable of accommodating a light, an opening, a first reflection portion capable of reflecting light emitted from the light onto a scanning range of a document, and a second reflection portion directly coupled to the light and arranged in a light path of the reflected light, the second reflection portion capable of reflecting the reflected light onto the scanning range, wherein the light is capable of emitting light onto the scanning range through said opening.

* * * * *

UNITED STATES PATENT AND TRADEMARK OFFICE
CERTIFICATE OF CORRECTION

PATENT NO.         : 7,443,550 B2                                                                 Page 1 of 1
APPLICATION NO. : 10/256962
DATED                  : October 28, 2008
INVENTOR(S)        : Yin-Chun Huang It is certified that error appears in the above-identified patent and that said Letters Patent is hereby corrected as shown below:

At column 6, line 32, please delete "tbrough" and insert -- through --.

At column 6, line 47, please delete "fainted" and insert -- formed --.

At column 7, line 20, please delete "foliated" and insert -- formed --.

Signed and Sealed this

Sixteenth Day of November, 2010

David J. Kappos
*Director of the United States Patent and Trademark Office*